(12) United States Patent
Jandel et al.

(10) Patent No.: US 9,081,108 B2
(45) Date of Patent: Jul. 14, 2015

(54) SYSTEM FOR DETECTING SPECIAL NUCLEAR MATERIALS

(71) Applicant: Los Alamos National Security, LLC, Los Alamos, NM (US)

(72) Inventors: Marian Jandel, Los Alamos, NM (US); Gencho Yordanov Rusev, Los Alamos, NM (US); Terry Nicholas Taddeucci, Santa Fe, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 91 days.

(21) Appl. No.: 13/784,045

(22) Filed: Mar. 4, 2013

(65) Prior Publication Data
US 2014/0246597 A1    Sep. 4, 2014

(51) Int. Cl.
*G01T 3/06*    (2006.01)
*G01V 5/00*    (2006.01)

(52) U.S. Cl.
CPC .................................... *G01V 5/0091* (2013.01)

(58) Field of Classification Search
CPC ................................ G01T 3/06; G01V 5/0091
See application file for complete search history.

(56) References Cited

U.S. PATENT DOCUMENTS

2003/0165211 A1 *    9/2003    Grodzins et al. .............. 376/155

FOREIGN PATENT DOCUMENTS

JP          2010156604 A  *  7/2010
WO     WO 2012150451 A1  * 11/2012

* cited by examiner

*Primary Examiner* — Constantine Hannaher
(74) *Attorney, Agent, or Firm* — Ryan B. Kennedy

(57) ABSTRACT

The present disclosure includes a radiological material detector having a convertor material that emits one or more photons in response to a capture of a neutron emitted by a radiological material; a photon detector arranged around the convertor material and that produces an electrical signal in response to a receipt of a photon; and a processor connected to the photon detector, the processor configured to determine the presence of a radiological material in response to a predetermined signature of the electrical signal produced at the photon detector. One or more detectors described herein can be integrated into a detection system that is suited for use in port monitoring, treaty compliance, and radiological material management activities.

4 Claims, 3 Drawing Sheets

SYSTEM FOR DETECTING SPECIAL NUCLEAR MATERIALS

STATEMENT REGARDING FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates generally to the field of detection and security, and more particularly to the sensing, detection, and monitoring of designated materials, such as special nuclear materials.

BACKGROUND OF THE INVENTION

One adverse consequence of the nuclear age is the potential proliferation and distribution of materials that can be hazardous or even catastrophic in their misuse. The United States Nuclear Regulatory Commission classifies special nuclear material into three broad categories based upon its potential threat. Category 1 includes strategic special nuclear material; category 2 includes special nuclear material of moderate strategic significance; and category 3 includes special nuclear material of low strategic significance. Each of the three categories of special nuclear material can be configured into a potential threat, ranging from a thermonuclear or atomic warhead to a clandestine nuclear weapon to a so-called dirty bomb.

Unfortunately, special nuclear material can become a significant risk in quantities on the order of kilograms, only increasing the portability of potentially devastating materials. Needless to say, early detection and monitoring of special nuclear material paramount concern to citizens and governments worldwide. Accordingly, there is a need in the art for an improved system for detecting special nuclear material that is readily deployable, easy to distribute throughout the nation's infrastructure, and highly accurate and reliable in its detection capabilities.

SUMMARY OF THE PRESENT INVENTION

One embodiment of the present invention can include radiological material detector having a convertor material that emits one or more photons in response to a capture of a neutron emitted by a radiological material; a photon detector arranged around the convertor material and that produces an electrical signal in response to a receipt of a photon; and a processor connected to the photon detector, the processor configured to determine the presence of a radiological material in response to a predetermined signature of the electrical signal produced at the photon detector.

A second embodiment of the present invention can include a radiological material detector including a convertor material that emits a photon cascade in response to a capture of a neutron emitted by a radiological material; a photon detector coupled to the convertor material and that produces an electrical signal in response to a receipt of a photon; a moderator disposed between the convertor material and the photon detector; and a processor connected to the photon detector. The processor is preferably configured for periodic photon counting to determine the presence of a radiological material in response to a detection of a photon cascade at the photon detector.

A third embodiment of the present invention can include a radiological material detector including a first converter material, a second converter material, and a third converter material, wherein a photon cascade is emitted by one of the first, second and third converter materials in response to a capture of a neutron; a first moderator and a second moderator each including extruded polystyrene; a first photon detector and a second photon detector, each including a polyvinyl toluene based scintillator or any other suitable scintillator to detect the photon cascade emitted in response to the capture of the neutron; and a processor connected to the photon detector. The processor is preferably configured for periodic photon counting to determine the presence of a radiological material in response to a detection of the photon cascade at the photon detector, wherein the period is substantially between 20 and 50 nanoseconds.

Additional advantages and features of these and other preferred embodiments of the present invention are described in detail below with reference to the appended drawings.

DETAILED DESCRIPTION OF THE PREFERRED EMBODIMENTS

The following description of the preferred embodiments of the present invention and variations thereof is made with reference to the Figures and one or more illustrative example configurations and/or implementations. Those of skill in the art will recognize that the following description is for illustrative purposes only and that the scope of the present invention is defined exclusively by the following claims.

Figure 1:
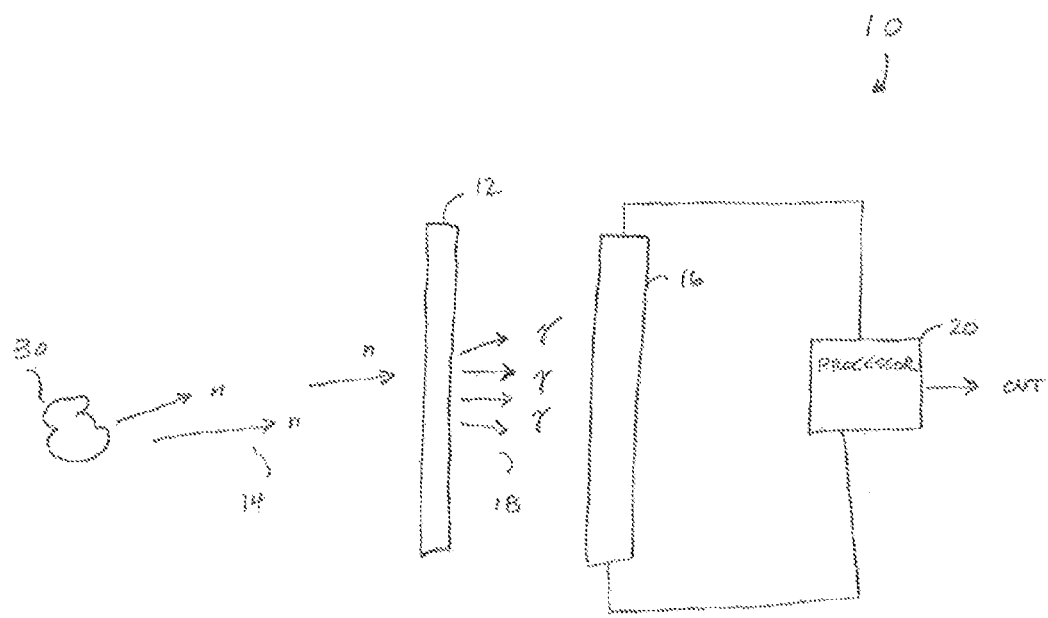
FIG. 1 is a schematic block diagram of a radiological detector in accordance with a preferred embodiment of the present invention.

As shown in FIG. 1, a radiological detector 10 according to a first preferred embodiment can include a convertor material 12 that emits one or more photons 18 in response to a capture of a neutron 14 emitted by a radiological material 30; a photon detector 16 arranged around the convertor material 12 and that produces an electrical signal in response to a receipt of a photon 18; and a processor 20 connected to the photon detector 16. Preferably, the processor 20 is configured to determine the presence of the radiological material 30 in response to a predetermined signature of the electrical signal produced at the photon detector 16. The first preferred detector 10 functions to monitor, survey, locate, and/or detect radiological material 30 of a predetermined category, such as for example special nuclear materials of relatively small quantities. The preferred detector 10 can be readily deployed in any number of configurations or missions, including research isotope security, port monitoring, treaty compliance, weapons storage/transportation, and/or any other industrial, security, or research application in which quantities of neutron-emitting materials are present.

Figure 2:
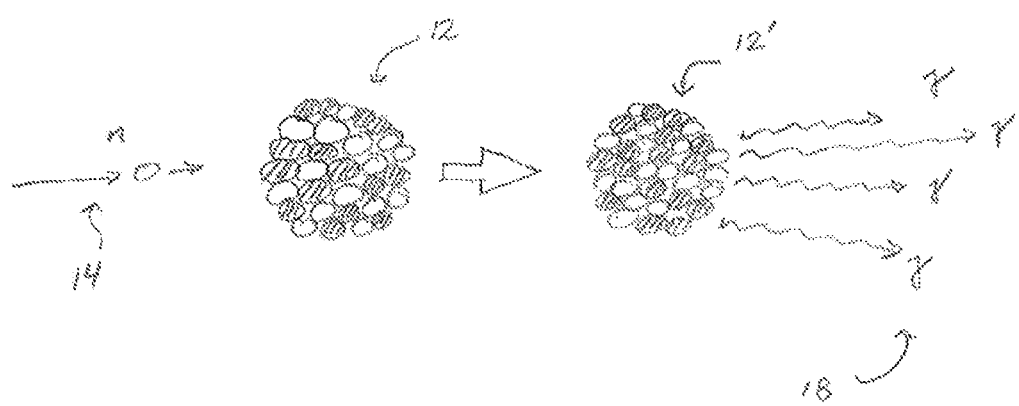
FIG. 2 is a schematic diagram of an interaction between a neutron and a nucleus that yields gamma radiation as exploited by the radiological detector of the preferred embodiment.

The functionality of the preferred detectors 10, 110 is premised on the physics relating to neutron 14 capture and photon 18 radiation by a convertor material 12. As shown in FIG. 2, a convertor material 12 includes a large number of atoms, each of which has a nucleus with a neutron capture cross section that determines the relative probability that the nucleus will capture or integrate the arriving neutron 14 into itself. On capture, the convertor material 12 nucleus adds mass and energy from the entering neutron 14 can becomes a compound nucleus 12'. The compound nucleus 12' exists for a relatively short time in a high energy and unstable state. In order to return to its minimal energy, the compound nucleus 12' will emit one or more photons in a cascade, wherein the one or more photons have an aggregate energy that is equal to the increased energy from the neutron 14 capture. Typical energies are on the order of five to six MeV for a neutron 14 capture event, which corresponds roughly from three to five gamma photons 18 emitted per capture event at each convertor material nucleus 12.

As shown in FIG. 1, the first preferred detector 10 preferably receives the photon cascade 18 at the photon detector 16. In typical use, the radiological material 30 will be of a sufficient size and nature to emit a very large number of neutrons 14, only some of which will be captured by the convertor material 12. However, the resultant gamma photon 18 emissions will be proportionally as large, with the result being that the photon detector 16 is effectively being bombarded with photons 18 of varying energy levels, including photons emitted directly from the radiological material 30 and passing through the convertor material 12. As such, in order to separate the signal from the noise, one variation of the first preferred detector 10 defines a photon cascade as a predetermined number of photonic events over a predetermined period. That is, the photon cascade is defined as a group of photons that are received and therefore likely emitted at the same time in response to a neutron capture event as shown in FIG. 2.

Accordingly, in another variation of the first preferred detector 10, the processor 20 is configured for periodic photon counting in response to electrical signals received at the photon detector 16. That is, the processor 20 is preferably configured to determine, compute, count, and/or calculate a photon count per unit time in order to determine whether the incident gamma radiation 18 is background noise or signal in response to a neutron capture event in the convertor material 12. In one alternative embodiment, the photon counting period is less than approximately 150 nanoseconds. More preferably, the period can be less than approximately 50 nanoseconds. In an example implementation of the preferred detector 10, the period is substantially between 20 and 50 nanoseconds. In other alternative embodiments, the period can be varied according to the size, shape, and deployment of the preferred detector 10, such that larger detectors 10 covering a larger solid angle of radiation 18 or expecting to detect larger quantities of radiological material 30 can have a photon counting period tailored to the expected results.

As shown in FIG. 1, the first preferred detector 10 can include a convertor material 12 that preferably functions to convert incident neutrons 14 into one or more photons 18 though the process of neutron capture described above. There are many different types and configurations of convertor materials 12 that can be used in the first preferred detector 10, including for example cadmium, gadolinium, any lanthanide element, any actinide element, or isotopes, compounds, or alloys thereof. Some larger elements such as actinides are radioactive in their own right (e.g., Californium), and therefore while their neutron capture cross sections are relatively large, their innate radioactivity might be more appropriate for only particular kinds of deployments of the first preferred detector 10. Both cadmium and gadolinum have very large neutron capture cross-sections, and they also both have relatively large Q values (energy released by neutron capture): approximately 8.9 MeV for Cadmium and approximately 7.9 MeV for Gadolinium. Those of skill in the art will readily appreciate that each of these elements can be alloyed, mixed, isotoped, compounded, and/or doped with each other or with other suitable materials in order to form a preferred structure for the convertor material 12.

As shown in FIG. 1, the first preferred detector 10 can further include a photon detector 16 that preferably functions to detect, register, receive, and/or capture an incident photon 18 and to produce, generate, create, and/or transmit an electrical signal in response thereto. The preferred photon detector 16 can include any suitable photon detector that is capable of receiving photons 18 of the anticipated energy levels (i.e., gamma rays) and generating the requisite electrical signals in response thereto. Suitable photon detectors 16 can include for example any one or more of a semiconductor photon detector, a plastic scintillating detector made of polyvinyl toluene for example, an an organic scintillating detector, an inorganic scintillating detector, a liquid scintillating detector, any any suitable combination or subcombination thereof. The photon detector 16 can preferably be arranged in any suitable configuration or geometry relative to the convertor material 12 in order to receive the photons 18 generated through the neutron capture process.

As shown in FIG. 1, the first preferred detector 10 can further include a processor 20 connected to the photon detector 16. The processor 20 preferably functions to receive the electrical signals generated by the photon detector 16 and to compute, calculate, categorize, determine, and/or process the received electrical signals into a determination of whether such electrical signals are indicative of the presence of a radiological material 30. As noted above, the preferred processor 20 can function in part by determining one or more time windows or periods during which the photon counting (via the received electrical signals) is performed, with a predetermined number of photons per period being more indicative of the presence of a radiological material 30. In particular, the processor 20 is preferably configured to recognize a signal indicative of the presence of radiological material 30 by computing, measuring, calculating, determining, and/or recognizing a two-dimensional space of correlated observable phenomena: the number of photons detected (M) and the total deposited energy (E) at the photon detector 16.

Figure 3:
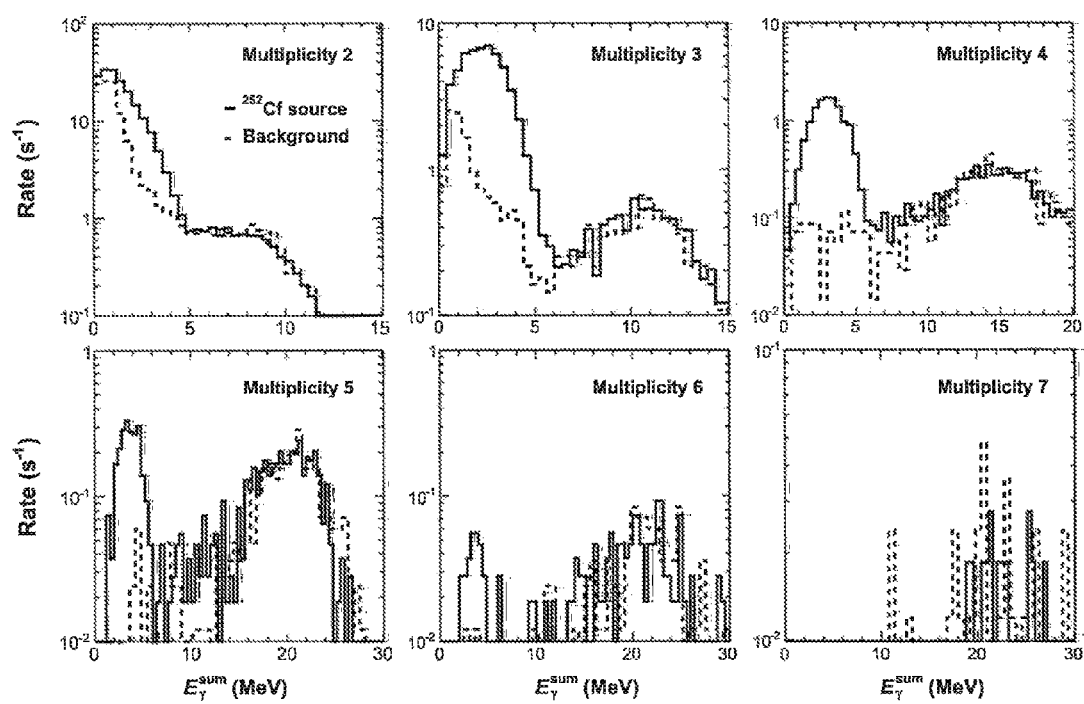
FIG. 3 is a graphical representation of data generated by an example embodiment of the preferred radiological detectors of the present invention.

FIG. 3 illustrates the foregoing process for multiplicities two through seven using one example configuration of the preferred detector 10 and a Californium-252 source as the radiological material 30. As shown in the example data, the preferred processor 20 is configured to separate the signal generated at the photon detector 16 generated by gamma rays emitted after neutron capture on a Cd convertor. In particular, FIG. 3 illustrates a well-defined separation for particular multiplicities one the lower end of the total energy axis for each multiplicity. The total internal detection efficiency (i.e., neutron detection efficiency) of the example configuration is approximately fifteen percent. In one alternative implementation of the first preferred detector 10, the processor 20 can be configured as a neural network or other type of artificial intelligence, heuristic, or learning machine algorithm for processing the received electrical signals from the photon detector and refining the mathematical models for detecting the radiological material 30 signal from the noise.

In another variation of the first preferred detector 10, the detector 10 can further include a moderator disposed between the convertor material 12 and the photon detector 16. The moderator preferably functions to thermalize any incident neutrons 14 and maximize the probability for neutron capture as well as to increase the detection efficiency of the photons 18. The moderator can be composed of any suitable material, including but not limited to one or more of high density polyethylene, methylene, ambient atmosphere, a portion of the photon detector, or extruded polystyrene. Any of the foregoing materials can be used alone or in combination to perform a moderating function. For example, a sufficiently large photon detector 16 composed of hydrogen-containing material such as plastic can function in part as a moderator at or near the photon detection process. Likewise, the convertor material 12 can be shielded by or embedded within a second material, such as methylene or extruded polystyrene, which can function to moderate the neutron 14 entry into the convertor material 12. Any other suitable combination or orientation of the various moderator material/s can be used in any desired geometry of the preferred detector 10, again depending at least in part upon the expected deployment of the preferred detector 10 and the expected volume of radiological material 30 and associated neutron energies to be detected.

Figure 4:
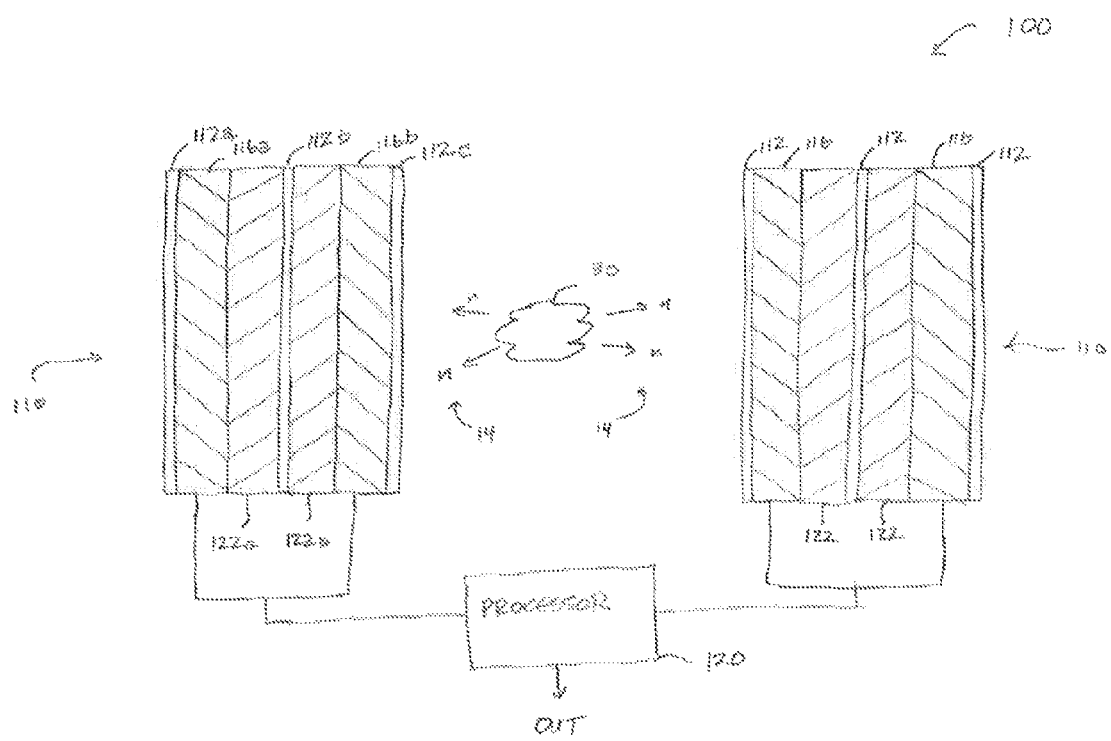
FIG. 4 is a schematic block diagram of a radiological detector in accordance with another preferred embodiment of the present invention.

A preferred detector system 100 is illustrated in FIG. 4. The preferred system 100 includes one or more detectors 110 according to a second preferred embodiment. The second preferred detectors 110 are each preferably connected to a processor 120 of the type described above. Each of the second preferred detectors 110 as shown includes three converter materials 112, two moderators 122, and two photon detectors 116. In other embodiments, the second preferred detector/s 110 can include one or more additional converter materials 112, moderators 122, and/or photon detectors 116. The second preferred detectors 110 are preferably arranged such that they substantially surround any radiological materials 30 within the preferred system 100. For example, the preferred system 100 can be arranged as a port or container monitoring apparatus, in which case at least one of the second preferred detectors 110 can be arranged next to an examination area through which any radiological material 30 would be required to pass. Alternatively, two or more of the second preferred detectors 110 can be arranged in any suitable geometry or distribution around a volume to be examined in order to maximize any potential neutron capture. As shown in FIG. 4, the second preferred detectors 110 can be arranged in a side-by-side configuration defining a central area that is subject to examination. Alternatively, additional or substitute second preferred detectors 110 can be arranged according to any other geometry in order to capture any solid angle of radiation that emanates from the center volume.

As shown in FIG. 4, one configuration of the second preferred detector 110 can include a first converter material 112a, a second converter material 112b, a third converter material 112c, a first moderator 122a, a second moderator 122b, a first photon detector 116a, and a second photon detector 116b. As shown, the example configuration is a layered detector 110 in which the first moderator 122a and the first photon detector 116a are disposed between the first and second converter material 122a, 122b and wherein the second moderator 122b and the second photon detector 116b are disposed between the second and third converter material 122b, 122c. Each of the first and second photon detectors 116a, 116b for each of the second preferred detectors 110 can be connected to the processor 120 according to any known mode or method, including in series or in parallel connections either through wired or wireless networking resources. Preferably, the second preferred detectors 110 are directly connected to the processor 120 via a coaxial cable or other connecting means with suitable speed and minimal losses, although other direct or indirect connections can be employed depending upon the deployment of the second preferred detector 110.

As shown in FIG. 4, a second preferred detector 110 can include one or more convertor materials 112 that preferably function to convert incident neutrons 14 into one or more photons 18 though the process of neutron capture described above. Suitable convertor materials 112 for the second preferred detector 110 can include cadmium, gadolinium, any lanthanide element, any actinide element, or isotopes, compounds, or alloys thereof. Cadmium and gadolinum have very large neutron capture cross-sections, and they also both have relatively large Q values (energies released by neutron capture): approximately 8.9 MeV for Cadmium and approximately 7.9 MeV for Gadolinium. Each of these preferred materials and/or elements can be alloyed, mixed, isotoped, compounded, and/or doped with each other or with other suitable materials in order to form a preferred structure for the convertor material 112.

As shown in FIG. 4, the second preferred detector 110 can further include one or more photon detectors 116 that preferably function to detect, register, receive, and/or capture an incident photon 18 and to produce, generate, create, and/or transmit an electrical signal in response thereto. The preferred photon detector 116 can include any suitable photon detector that is capable of receiving photons 18 of the anticipated energy levels (i.e., gamma rays) and generating the requisite electrical signals in response thereto. As noted above, suitable photon detectors 116 can include for example any one or more of a semiconductor photon detector, a plastic scintillating detector, a liquid scintillating detector, a polyvinyl toluene scintillating detector, or any suitable combination or sub-combination thereof. The photon detectors 116 can preferably be arranged in any suitable configuration or geometry relative to the convertor materials 112 in order to receive the photons 18 generated through the neutron capture process. For example, the photon detectors 116 can be arranged in a layered format as shown in FIG. 4 and described above.

As shown in FIG. 4, the second preferred detector 110 can further include one or more moderators 122 disposed between the convertor materials 112 and the photon detectors 116. The moderators 122 preferably function to thermalize any incident neutrons 14 and maximize the probability for neutron capture as well as to increase the detection efficiency of the gamma rays 18 by moderating or eliminating potential sources of noise at the photon detectors 116. The moderators 122 can be composed of any suitable materials, including but not limited to one or more of methylene, ambient atmosphere, a portion of the photon detector, or extruded polystyrene, in the layered configuration of the second preferred detectors 110 shown in FIG. 4, one of skill in the art will note that the first and second photon detectors 116a, 116b can function both to detect incident photons as well as to moderate the transmission of neutrons through to the opposing side of the second preferred detector 110. As such, those of skill in the art will readily appreciate that additional variations of the disclosed geometry can be designed that take advantage of the dual functionality of the some of the components of the second preferred detector 116.

As shown in FIG. 4, the preferred system 100 can further include a processor 120 that preferably functions to receive the electrical signals generated by the photon detectors 116 and to compute, calculate, categorize, determine, and/or process the received electrical signals into a determination of whether such electrical signals are indicative of the presence of a radiological material 30. A preferred processor 120 can function in part by determining one or more time windows or periods during which the photon counting (via the received electrical signals) is performed, with a predetermined number of photons per period being more indicative of the presence of a radiological material 30. As noted above, the preferred processor 120 can be configured to recognize a signal indicative of the presence of radiological material 30 by computing, measuring, calculating, determining, and/or recognizing a two-dimensional space of correlated observable phenomena: the number of photons detected (M) and the total deposited energy (E) at the photon detectors 116. In other embodiments, the preferred systems 10, 100 can be configured to determine the presence of gamma-emitting special nuclear materials through the direct detection of those gamma rays at the photon detectors 116. In particular, comparison of incident gamma radiation with a measured and/or expected background gamma radiation can be indicative of the presence of special nuclear material that is emitting gamma rays.

In another variation of the preferred embodiments, the processors 20, 120 can be configured as modules or system components that are configured to execute computer-executable instructions through the interaction of computer software, firmware, and/or hardware. The preferred processors 20, 120 can function in part as program modules being executed in a computing environment on a target real or virtual processor. Generally, program modules include routines, programs, libraries, objects, classes, components, data structures, etc. that perform particular tasks or implement particular data types. The functionality of the preferred processors 20, 120 can be combined or split between program modules as desired in various embodiments. Computer-executable instructions for program modules can be executed within a local or distributed computing environment, which can include for example two or more networked processors 20, 120 performing one or more tasks serially or in parallel. For the sake of presentation, the detailed description uses terms like "determine," "receive," and "perform" to describe preferred processor 20, 120 functionality in a operational radiological detection environment. These terms are high-level abstractions for operations performed by a computer, microcomputer, or processor, and should not be confused with acts performed by a human being. The actual processing operations corresponding to these terms vary depending on implementation.

The foregoing description of the invention has been presented for purposes of illustration and description and is riot intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A radiological material detector comprising:
   a first converter material, a second converter material, and a third converter material, wherein a photon cascade is emitted by one of the first, second and third converter materials in response to a capture of a neutron;
   a first moderator and a second moderator each comprising extruded polystyrene;
   a first photon detector and a second photon detector, each comprising a polyvinyl toluene scintillator to detect the photon cascade emitted in response to the capture of the neutron;
   wherein the first moderator and the first photon detector are disposed between the first and second converter material and wherein the second moderator and the second photon detector are disposed between the second and third converter material; and
   a processor connected to the photon detector, the processor configured for periodic photon counting to determine the presence of a radiological material in response to a detection of the photon cascade at the photon detector, wherein the period is substantially between 20 and 50 nanoseconds.

2. The detector of claim 1, wherein the convertor material is selected from the group consisting of: cadmium, gadolinium, or isotopes, compounds, or alloys thereof.

3. The detector of claim 1, wherein the convertor material is selected from the group consisting of: cadmium, a lanthanide element, an actinide element, or isotopes, compounds, or alloys thereof.

4. The detector of claim 1, wherein the convertor material comprises one of cadmium or gadolinium.

* * * * *